Aug. 30, 1938.  A. G. JOHNSON  2,128,300
GRIPPER FOR TRACTOR-DRIVEN PLOWS
Filed Sept. 22, 1937
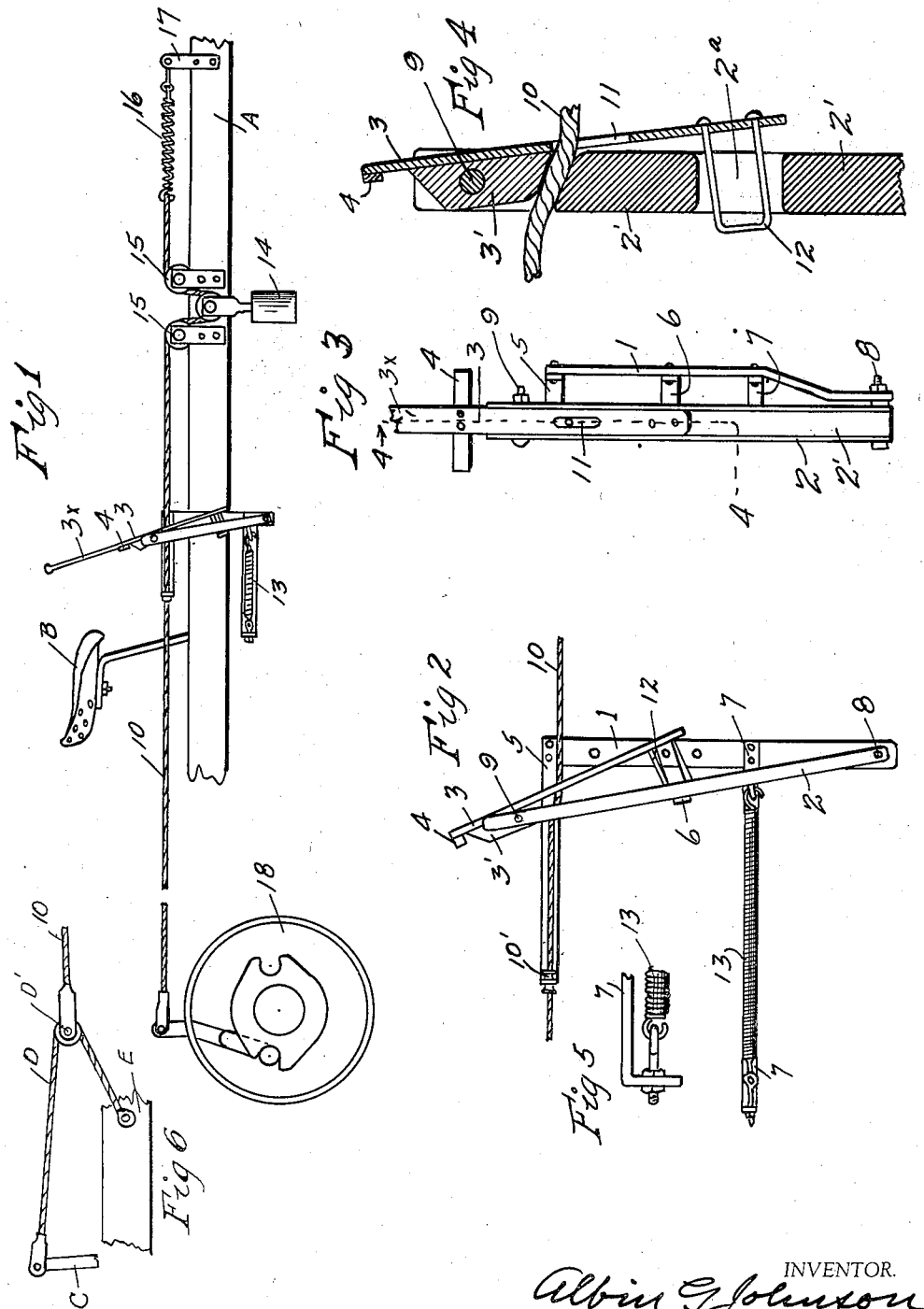
INVENTOR.
Albin G. Johnson
BY
ATTORNEYS.

Patented Aug. 30, 1938

2,128,300

UNITED STATES PATENT OFFICE 2,128,300

GRIPPER FOR TRACTOR-DRIVEN PLOWS

Albin G. Johnson, near Cambridge, Ill.

Application September 22, 1937, Serial No. 165,147

13 Claims. (Cl. 97—50)

My invention relates to improvements in gripping apparatus.

The objects of my invention are to provide simple, easy and safely operable method and means for actuating plow-tripping mechanisms for or in connection with tractor-drawn plows or other agricultural implements and which can be operated by the foot or hand of the driver; to provide means by which a trip-rope, cable, wire or similar part may be firmly gripped at any point at which it is contacted by the gripper mechanism and may be pulled through the limits of movement of said gripper; to provide a gripper which will permit a rope, cable or wire to travel freely therein when not gripped and which, when actuated, will readily and firmly grip such rope or cable at its point of contact with the gripper; to provide means operable either by hand or by foot for actuating the tripping mechanism of a tractor-drawn plow or similar implement.

I attain these objects by the means illustrated in the accompanying drawing in which—

Figure 1 is a diagrammatic sketch showing the application of my apparatus to the frame of a tractor and to the tripping mechanism of a plow;

Figure 2 is a detail elevation of my apparatus;

Figure 3 is a front detail elevation of my apparatus;

Figure 4 is an enlarged sectional detail of my apparatus on the line 4—4 of Figure 3;

Figure 5 is a detail plan view of the retaining spring and its supporting arm; and Figure 6 is an enlarged detail showing an alternative form of connecting the trip rope to the trip lever.

Similar numerals refer to similar parts throughout the several views.

My apparatus in its simplest form comprises a supporting bar 1 which may be united to the side frame A of a tractor by bolts, rivets or other suitable means. The lower end of the bar 1 extends below the tractor frame A and the upper end of the supporting bar extends somewhat above the side frame of the tractor, but it is obvious that it may be secured in whatever position relative to the tractor frame would be most convenient and facilitate its operation.

The lower end of the supporting bar 1 has pivotally united thereto the lower end of the arm 2 which is preferably comprised of two flat plates or bars of iron having a wooden bar 2' secured between them rigidly, which wooden bar 2' forms the lower gripping member of my gripper. In the upper end of the arm 2 there is pivotally mounted a lever 3 the upper end of which has united thereto a foot rest 4 to accommodate the foot of the driver and which has united thereto a wooden block 3' which forms the upper gripping member of my gripper.

If desired, the bar 3 may be extended upwardly as shown at 3X in Figure 1 and have a ball handle united thereto so that the lever can be operated either by the hand or by the foot of the driver.

The gripping members 2' and 3' may be of either wood, metal or other material as desired, but I prefer to use a durable hard wood for these members, as a wood grip appears to take a firmer hold upon the rope or cable and will cause less wear thereof than an iron grip. The upper end of the block 2' is slightly rounded and is formed with a groove extending forward and aft in its upper face corresponding roughly to the shape of the rope 10 and the lower end of the block 3' is slightly rounded and has a similar groove formed therein. The lower end of the lever 3 has a yoke or stop 12 of metal united thereto, the end of which passes through a suitable opening 2a formed in the block 2'. A stop bar 6 has one end rigidly united to the supporting bar 1 and its opposite end is turned at a right angle to the main portion thereof so as to provide a stop or detent for the yoke 12 when in its released position as shown in Figure 2.

The stop bar 6 also acts as a stop or detent for the arm 2 so as to limit the distance which the arm 2 can travel toward the rear while the permissible travel of the trip lever to which the rear end of the rope 10 is attached determines the limit of the forward movement of the arm 2.

The lever 3 is provided with an opening 11 near the middle thereof through which the cable 10 may freely pass.

The cable 10 has its rear end attached to the trip lever or other tripping mechanism of the plow as shown in Figure 1, but as the tripping mechanism forms no part of my invention and my gripping mechanism is applicable to any rope or cable-operated tripping mechanism, the tripping mechanism is not shown in detail and I do not limit my claims to the use of my gripper with any particular form of tripping mechanism.

The front end of the cable 10 is preferably attached to a tension spring 16 one end of which is attached to a support 17 which may be bolted or riveted to the tractor frame A. The purpose of the spring 16 is to afford means for taking up any slack which may be caused in the rope 10 due to the tractor turning in one direction, and it is designed also to permit the rope to be extended when the tractor is turned in the opposite direction so as to keep a limited tension upon the rope 10 at all times. A similar result may be reached by mounting a weight 14 upon the rope or cable by a suitable pulley and for this purpose guide pulleys 15 may be pivotally mounted in suitable supports riveted or bolted to the tractor frame A to guide and support the rope at each side of the weight pulley. Either the spring 16 or weight 14 may be thus used as a means for preventing slack or both of them may be used simultaneously if desired.

In the operation of my device, assuming that the plow is operated at a normal depth in the ground and the driver seated upon the seat B wishes to have the plow lifted out of the ground, he puts his foot upon the foot rest 4 and pushes it forward. The yoke 12 being in contact with the stop 6 the pressure of the driver's foot will force the upper end of the lever 3 forward, thus permitting the lower end of the lever 3 to move toward the rear and cause the gripping members 2' and 3' to grip the rope or cable 10 firmly. The driver then continues the forward movement of his foot and the continued movement of the arm 2 carries forward with it the rope or cable 10 which is firmly gripped between the members 2' and 3' and thus actuates the trip-lever to which the rear end of the rope 10 is attached. The forward motion of the wheel 18 when the tripping member is actuated, carries with it a cam and connecting mechanism that lifts the plow from the ground in the wellknown manner now in common use. Likewise, when the plow is being carried above the ground and the driver desires to cause it to descend into engagement with the ground, he goes through the same movement and the rope operating in the same way actuates the trip which permits the plow mechanism to cause the plow to descend into the ground. As soon as the trip has been actuated by the pulling of the rope 10 the driver withdraws his foot from the member 4 and at once the spring 13 pulls the arm 2 back to its normal position, one end of the spring 13 being attached to the arm 2 and the opposite end of the spring 13 being attached to an arm 7 bolted to the supporting bar or otherwise suitably secured in the proper position.

The spring 13 also performs an important function in detaining the arm 2 while the lever 3 performs the initial movement which causes the gripping members to seize the rope, and then permits the arm 2 to be carried forward with the lever 3 during the continued pushing movement of the driver's foot.

In the operation of my device, the tractor and plow are coupled together in the usual manner and the driver sits upon the seat B with the foot rest 4 in easy reach of one of his feet.

When desired to actuate the tripping mechanism, as such devices have been constructed in the past, it was necessary for the driver to reach down with one hand and pull the rope 10 to actuate the trip, but in cases where the tractor was making a turn or where the driver, by reason of age or weakness, was somewhat unsteady on the seat, there was more or less danger of a driver falling and being injured while pulling the rope 10 by hand. With my apparatus, he places his foot upon the foot rest 4 and pushes it forward. The gripping members 2' and 3' then grip the cable 10 between them and as the forward movement of the foot rest is continued, the gripping members carry the rope 10 forward until it has tripped the plow mechanism which raises or lowers the plow. The driver then removes his foot from the foot rest 4 and the lever 3 and arm 2 return to their normal positions and the apparatus is set for the next operation.

It is obvious that various modifications may be made without departing from the spirit of my invention and I do not limit my claims to the precise form of apparatus illustrated in the drawing.

As it is difficult to find a word which accurately describes both the gripping action of the members 2' and 3' and the holding action of the drum when actuated by the ratchet teeth, I use the word "seize" in some of the claims to apply to both, and desire it to be so understood. I also use the word "manually" in the claims to indicate the use of muscle power whether of the hand and arm or of the foot and leg.

When desired to shorten the travel of the rope 10 required to actuate the trip lever, a stub rope D may have one end attached to the trip lever C and its opposite end rigidly attached to the frame E of the plow. A yoke may be attached to the rear end of the rope 10 carrying a pulley upon the pivot D' in which the stub rope D travels. With this arrangement, the rope 10 will only have to travel half as far to actuate the trip lever C as when arranged as shown in Figure 1.

I claim:

1. Apparatus for actuating the trip rope of a tractor-drawn plow, comprising a support united to the tractor frame, an arm having one end pivotally mounted upon said support, a lever pivoted upon the free end of the arm, a gripping member united to the arm, a complementary gripping member united to the lever, a trip rope or cable passing between said gripping members and freely movable longitudinally between them when said members are idle but adapted to be gripped by said members when actuated in the forward direction by pressure upon the upper end of the lever.

2. A gripping apparatus for actuating the trip rope of a tractor-drawn implement, comprising a support, an arm having one end pivotally mounted upon said support, a lever pivoted upon the free end of the arm, a gripping member united to the arm, a complementary gripping member united to the lever, a trip rope or cable passing between said gripping members and freely movable longitudinally between them when said members are idle but adapted to be successively gripped and then drawn forward by said members when actuated in the forward direction by pressure upon the upper end of the lever.

3. A gripping apparatus for actuating the trip rope of a tractor-drawn implement, comprising a support united to the tractor frame, an arm pivotally mounted upon said support, a lever pivoted upon the free end of the arm, a gripping member united to the arm, a complementary gripping member united to the lever, a trip rope or cable passing between said gripping members and freely movable longitudinally between them when said members are idle but adapted to be successively gripped and then drawn forward by said members when actuated in the forward direction by pressure upon the upper end of the lever.

4. A gripping apparatus for actuating the trip rope of a tractor-drawn plow, comprising a support united to the tractor frame, an arm having one end pivotally mounted upon said support, a lever pivoted upon the free end of the arm, a gripping member united to the lever, a complementary gripping member united to the arm, a rope or cable passing between said gripping members and guided thereby and adapted to be gripped by said members when actuated in the forward direction by pressure upon one end of the secondary lever.

5. In an actuating mechanism for a trip rope, a support, an arm pivoted at one end to the support, a lever intermediately pivoted upon the free end of the arm, coacting means mounted upon the arm and the lever respectively adapted to guide and permit free longitudinal movement of the trip rope between such means, and to successively seize and then carry forward the rope when one end of the lever is manually actuated forwardly through a predetermined arc, a foot rest united to the upper end of the lever, a detent adapted to limit the movement of the lower end of the lever rearwardly, and resilient means carried by the support and united to the arm exerting yielding rearward traction upon the arm.

6. In an actuating mechanism for a trip rope, a support, an arm pivoted at one end to the support, a lever intermediately pivoted upon the free end of the arm, coacting means mounted upon the arm and the lever respectively adapted to guide and permit free longitudinal movement of the trip rope between such means, and to successively seize and then carry forward the rope when one end of the lever is manually actuated forwardly through a predetermined arc, a foot rest united to the upper end of the lever, a detent united to the support adapted to limit the movement of the lower end of the lever rearwardly, resilient means united to the arm and to the support exerting yielding rearward traction upon the arm, and resilient means exerting continuous tension forwardly upon the rope ahead of the gripping means adapted to take up any slack occurring in the rope.

7. In an actuating mechanism for a trip rope, a support, an arm pivoted at one end to the support, a lever intermediately pivoted upon the free end of the arm, coacting means mounted upon the arm and the lever respectively adapted to guide and permit free longitudinal movement of the trip rope between such means, and to successively seize and then carry forward the rope when one end of the lever is manually actuated forwardly through a predetermined arc, a foot rest united to the upper end of the lever, a detent united to the support adapted to limit the movement of the lower end of the lever rearwardly, resilient means united to the arm and to the support exerting yielding rearward traction upon the arm, and means exerting continuous tension forwardly upon the rope ahead of the gripping means adapted to take up any slack occurring in the rope.

8. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver.

9. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver, and resilient means united to the tractor frame and to the trip rope adapted to exert sufficient continuous tension upon the trip rope to take up any slack therein incident to the operation of such tractor and implement.

10. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver, and resilient means united to the tractor frame and to said manually operable means adapted to hold said means normally in open position to permit free longitudinal movement of the rope therein.

11. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver, resilient means united to the tractor frame and to the trip rope adapted to exert sufficient continuous tension upon the trip rope to take up any slack therein incident to the operation of such tractor and implement, and resilient means united to the tractor frame and to said manually operable means adapted to hold said means normally in open position to permit free longitudinal movement of the rope therein.

12. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver, and resilient means carried by the tractor frame and united to the trip rope adapted to exert sufficient continuous tension upon the trip rope to take up any slack therein incident to the operation of such tractor and implement.

13. In apparatus for actuating the trip of a motor-driven implement by a rope having one end united to the trip lever of the implement, and its opposite end united to the frame of the tractor, the combination with a support united to the tractor frame, of manually operable means mounted upon said support adapted to guide and permit free longitudinal forward or backward movement of the trip rope therein within fixed limits and successively to seize said rope and pull same forward a predetermined distance when manually actuated by the tractor driver, and means carried by the tractor frame and united to the trip rope adapted to exert sufficient continuous tension upon the trip rope to take up any slack therein incident to the operation of such tractor and implement.

ALBIN G. JOHNSON.